US 8,498,225 B2
(45) Date of Patent: Jul. 30, 2013

(12) United States Patent
Li et al.

(10) Patent No.: US 8,498,225 B2

(54) METHOD OF CONTROLLING SINGLE-FREQUENCY NETWORK AND SINGLE-FREQUENCY NETWORK CONTROLLER

(75) Inventors: Zhenling Li, Beijing (CN); Xiaodong Shen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 326 days.

(21) Appl. No.: 12/740,272

(22) PCT Filed: Oct. 10, 2008

(86) PCT No.: PCT/CN2008/001720
§ 371 (c)(1),
(2), (4) Date: Oct. 11, 2010

(87) PCT Pub. No.: WO2009/056005
PCT Pub. Date: May 7, 2009

(65) Prior Publication Data
US 2011/0019589 A1 Jan. 27, 2011

(30) Foreign Application Priority Data

Oct. 29, 2007 (CN) .......................... 2007 1 0176504

(51) Int. Cl.
*H04L 12/28* (2006.01)
(52) U.S. Cl.
USPC ....................................................... 370/255
(58) Field of Classification Search
USPC ............... 370/255, 312, 350, 448; 455/452.1, 455/466, 507
See application file for complete search history.

(56) References Cited

U.S. PATENT DOCUMENTS

2008/0274759 A1* 11/2008 Chen et al. .................... 455/507
2011/0021224 A1* 1/2011 Koskinen et al. ............. 455/507

FOREIGN PATENT DOCUMENTS

EP 1677460 A1 7/2006

OTHER PUBLICATIONS

International Search Report from International Application No. PCT/CN2008/001720 completed on Nov. 28, 2008 and mailed on Dec. 25, 2008.

\* cited by examiner

*Primary Examiner* — Dang Ton
*Assistant Examiner* — Nourali Mansoury
(74) *Attorney, Agent, or Firm* — Duane Morris LLP

(57) ABSTRACT

This invention discloses a control method of a single-frequency network and a control entity of a single-frequency network. The control method of the single-frequency network provided by this invention comprises: obtaining the service request information sent by a user terminal; changing the single-frequency network according to the service request information. The control entity of the single-frequency network provided by this invention comprises: an obtaining unit, used for obtaining the service request information sent by a user terminal; a controlling unit, used for changing the single-frequency network according to the service request information. This invention realizes the dynamic control of a single-frequency network by changing the single-frequency network according to the service request information sent by a user terminal. Consequently, the service provider can dynamically change a single-frequency network according to the requirement of users and implement the optimization configuration of wireless network resources.

13 Claims, 5 Drawing Sheets

Structure of signaling sent to base station

| Time stamp | SFN controller ID | Base station ID | SFN ID | ID of service provided by SFN | Others |
|---|---|---|---|---|---|

METHOD OF CONTROLLING SINGLE-FREQUENCY NETWORK AND SINGLE-FREQUENCY NETWORK CONTROLLER

CROSS REFERENCE TO RELATED APPLICATIONS

The present application claims the benefit of priority to International Patent Application No. PCT/CN2008/001720 filed Oct. 10, 2008, which claims the benefit of priority to Chinese Patent Application No. 200710176504.9 filed Oct. 29, 2007, the entireties of which are herein incorporated by reference.

FIELD OF THE INVENTION

The present invention relates to the control of a Single Frequency Network, and in particular to a method for dynamically controlling a Single Frequency Network and a corresponding Single Frequency Network controller.

BACKGROUND OF THE INVENTION

In the coverage of a traditional Multiple Frequency Network, a signal is transmitted by a transmitter in a service area at different frequencies to avoid interference between neighboring transmitters. A broadcast service such as a Multimedia Broadcast Multicast Service (MBMS) typically occupies a relatively broad frequency band due to the large amount of transmitted data. Therefore, the broadcast service is implemented usually using a scheme of single frequency coverage, i.e. a Single Frequency Network (SFN), in the prior art.

In the Single Frequency Network, multiple synchronous radio transmitters at different sites transmit the same signal at the same frequency concurrently, to implement reliable coverage of a certain service area.

First, the Single Frequency Network is advantageous in frequency planning, so that the precious frequency resources can be saved significantly and the utilization of the frequency spectrum can be improved. Secondly, in a city with lots of high buildings, there exist numerous areas without the coverage of a radio signal due to the property of the radio signal per se regardless of the large transmission power of the single transmitter station, such an area without the coverage of the radio signal may be referred to as a blind coverage area or blink area, and can be eliminated in such a manner that the signal is transmitted over the same frequency at multiple stations in the Single Frequency Network, to obtain improved coverage. Thirdly, the Single Frequency Network technologies enable the reduction of costs of the transmitter device in that multiple transmitters with small power instead of one transmitter with large power can be adopted by optimizing and adjusting the transmission network (such as the number and distribution of base stations, the height of transmission antennae, and transmission power) in the Single Frequency Network, thereby reducing signal radiation and electromagnetic wave pollution, and improving coverage uniformity; in addition, the intended coverage can be modified as desired at any time.

In the Single Frequency Network, merely one frequency band is required for the multiple transmitters to transmit one signal, so that the frequency resources can be saved greatly. A User Equipment (UE) can process signals from the multiple base stations as multi-path signals. It is possible that particular time slots are designated for the MBMS service. Further, diversity is achieved by the simultaneous transmission of the multiple transmitters, so that the reliability of the receiver can be enhanced effectively to obtain the coverage required for reliable service. Additionally, the transmission network can be adjusted and optimized as desired, so that the total power consumption can be lowered, and the interference with any other network in the environment can be reduced.

At present, the Single Frequency Network is controlled in a static manner in the prior art, that is, base stations and the number thereof within a given Single Frequency Network are consistent. Or, the Single Frequency Network can be controlled in such a dynamic manner that a simple "switch on/off" mode is available, that is, the base stations within the Single Frequency Network can be managed in the "switch on/off" mode, and a certain base station is either switched on to implement various services configured at the Single Frequency Network or switched off to no longer implement the services configured at the Single Frequency Network. Therefore, it is very difficult for an operator to effectively optimize wireless network resources in the prior art, and it is impossible to allocate resources based on service requirements of users.

SUMMARY OF THE INVENTION

An embodiment of the present invention provides a method for controlling a Single Frequency Network, to enable dynamic control of the Single Frequency Network according to service requirements of a user.

An embodiment of the present invention provides a Single Frequency Network controller, to enable dynamic control of the Single Frequency Network according to service requirements of a user.

The method for controlling a Single Frequency Network according to an embodiment of the present invention includes:

obtaining a service request sent by a User Equipment; and modifying a Single Frequency Network according to the service request.

The Single Frequency Network controller according to an embodiment of the present invention includes:

an obtaining unit configured to obtain a service request sent by a User Equipment; and a control unit configured to change a Single Frequency Network according to the service request.

With the Single Frequency Network controlling method and the Single Frequency Network controller according to the embodiments of the present invention, by obtaining the service request sent by the User Equipment and changing the Single Frequency Network according to the service request sent by the User Equipment, the Single Frequency Network can be controlled dynamically, thereby enabling an operator to change the Single Frequency Network according to service requirements of the user (for example, a Single Frequency Network is added or removed, or base stations within the Single Frequency Network are increased or reduced), implementing the optimal configuration of the wireless network resources, and effectively improving the resource utilization while satisfying the requirements of the user.

DETAILED DESCRIPTION OF THE EMBODIMENTS

Figure 1:
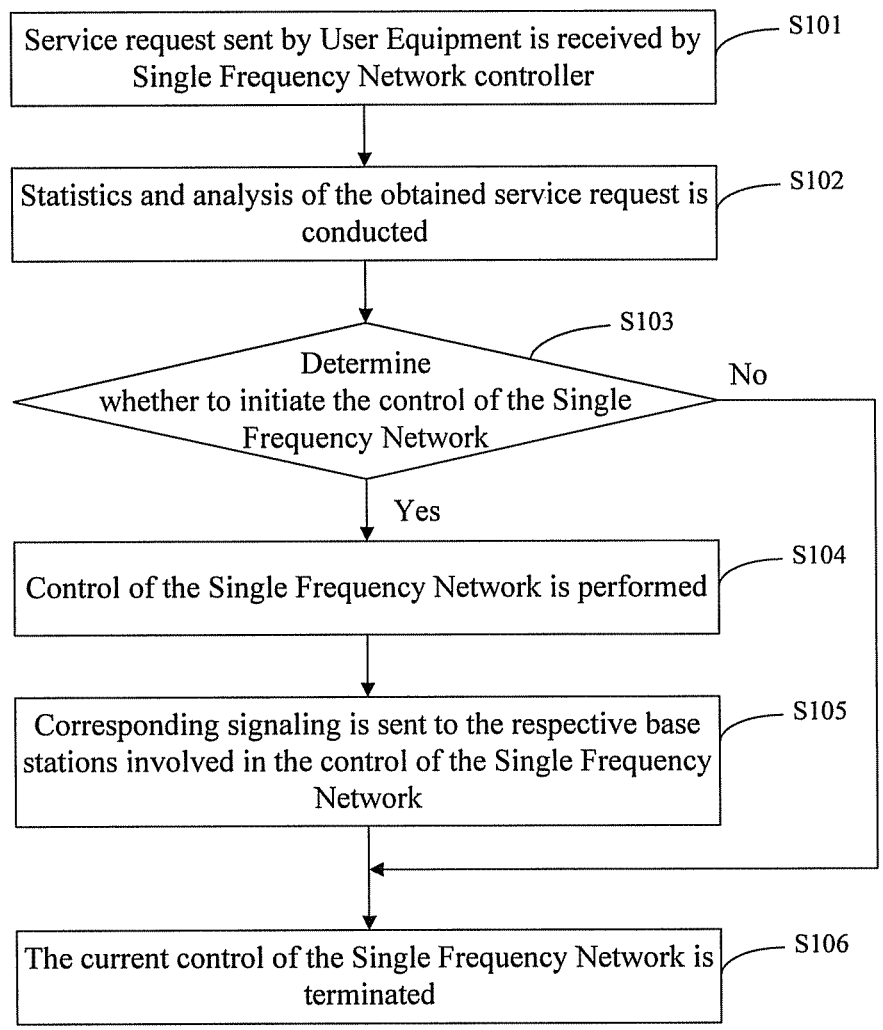
FIG. 1 is a flowchart illustrating an overall procedure of dynamically controlling a Single Frequency Network according to an embodiment of the present invention.

An embodiment of the invention provides a method for controlling a Single Frequency Network, including: obtaining a service request sent by a User Equipment; and modifying a Single Frequency Network according to the service request sent by the User Equipment.

Obtaining the service request sent by the User Equipment and modifying the Single Frequency Network can be implemented by a single function entity in the network, which is hereinafter referred to as a Single Frequency Network controller for the sake of description. The network may include a plurality of Single Frequency Network controllers, and each of Single Frequency Network controllers can control the Single Frequency Network locally in a distributed manner, or the plurality of Single Frequency Network controllers can control the Single Frequency Network globally in a centralized manner in which direct or indirect signaling interfaces need to be provided between the controllers.

Obtaining the service request sent by the User Equipment can be implemented in various manners which are not limiting herein. For example, obtaining the service request sent by the User Equipment can be implemented in the following approaches.

A first approach: The service request sent by the User Equipment is obtained from a base station serving the User Equipment.

For example, the service request, which may include a service identifier corresponding to the requested service and the service initiation time requested by the User Equipment, is sent by the User Equipment via an uplink feedback channel to the base station serving the User Equipment. The Single Frequency Network controller queries all the base stations periodically to obtain the service request sent by the User Equipments from the respective base stations. Alternatively, the base station notifies the Single Frequency Network controller of receipt of the service request sent by the User Equipment, and the Single Frequency Network controller obtains the service request sent by the User Equipment from the base station after receiving the notification from the base station.

A second approach: The service request sent by the User Equipment is obtained from a core network.

For example, the service request is sent by a User Equipment to the base station serving the User Equipment via an uplink feedback channel, and the base station transmits the service request transparently or forwards the same through a relay node to the core network for storing. The Single Frequency Network controller obtains the service request sent by the User Equipments from the core network in a preset period. Alternatively, the core network notifies the Single Frequency Network controller of receipt of the service request sent by the User Equipment, and the Single Frequency Network controller obtains the service request from the core network after receiving the notification from the core network.

A third approach: The service request sent by the User Equipment is obtained from another network entity.

For example, the service request is sent by the User Equipment via an uplink feedback channel to the base station serving the User Equipment. The base station forwards the service request to an MBMS Coordinating Entity (MCE) in the prior art, and the MCE reports the service request to the Single Frequency Network controller.

A fourth approach: The service request is sent by the User Equipment to the Single Frequency Network controller directly.

In embodiments of the present invention, modifying the Single Frequency Network according to the service request sent by the User Equipment may include: adding or removing the Single Frequency Network, and adding the base station to or removing the base station from an existing Single Frequency Network.

By taking the MBMS service as an example, detailed expression is provided below to illustrate how to add or remove a Single Frequency Network according to the service request sent by the User Equipment and to add the base station to or remove the base station from the existing Single Frequency Network.

With reference to FIG. 1, an overall flowchart of controlling dynamically the Single Frequency Network according to an embodiment of the present invention is shown and includes the following processes.

Process S101: The service request sent by the User Equipment is received by a Single Frequency Network controller.

As described above, in process S101, the service request sent by the User Equipment can be obtained in a manner including, but not limited to, the first, second, third and fourth approaches above. The process of receiving the service request sent by the User Equipment is repeated continuously.

Process S102: Statistics and analysis of the service request is conducted.

In process S102, various statistics and analysis modes can be used. For example, a statistics period can be preset, and the statistics is conducted when a statistics time point is reached according to the preset statistics period.

The statistics of the service request is described illustratively below.

1) A base station is taken as an object of the statistics.

In this case, base stations serving the User Equipments requesting for each type of service are determined, the types of services requested by the User Equipments pertaining to the same base station are determined, and the number of User Equipments requesting for the same type of service is calculated, so that a dynamic statistics table is generated for each base station, as shown in Table 1 below.

TABLE 1

| Service type identifier | Number of User Equipments requesting for service |
|---|---|
| The first type of service | 10 |
| The second type of service | 20 |
| ... | ... |
| The Nth type of service | X |

Likewise, corresponding statistics tables can be generated for other base stations such as a second base station and a third base station.

Based on the obtained statistics tables of the various base stations, it is possible to further calculate a total number of User Equipments pertaining to all of the base stations that request for a certain type of service, and determine one or more base stations serving the most User Equipments requesting for a certain type of service.

2) A service type is taken as an object of the statistics.

According to all the received service requests, the involved service types are determined, and the number of User Equipments requesting for each type of service is calculated. Further, the base stations serving each User Equipment are determined, the number of User Equipments requesting for the same type of service at each base station is calculated, and the base stations are sorted according to the calculated numbers of the User Equipments, to determine the base station taking the primary responsibility of providing a certain service.

The above statistics and analysis methods are merely illustrative, various statistics and analysis can be carried out depending on particular applications and actual requirements in the practices, and the invention is not limited to this.

Process S103: It is determined whether to initiate the control of the Single Frequency Network according to the statistics and analysis results.

Initiating of the control of the Single Frequency Network is not necessary if the current statistics and analysis results are substantially the same as the immediately preceding statistics and analysis results, and process S106 is performed and the current control of the Single Frequency Network is terminated; otherwise, process S104 is performed.

Process S104: The control of the Single Frequency Network is performed.

In process S104, the modes of controlling the Single Frequency Network include, but not limited to:

a first control mode of adding the Single Frequency Network;

a second control mode of removing the Single Frequency Network;

a third control mode of adding the base station to the existing Single Frequency Network; and a fourth control mode of removing the base station from the existing Single Frequency Network.

Each of the control modes will be described in detail in different application scenarios in embodiments of the present invention.

Process S105: Corresponding signaling is sent to the respective base station involved in the control of the Single Frequency Network.

Figures 2, 3:
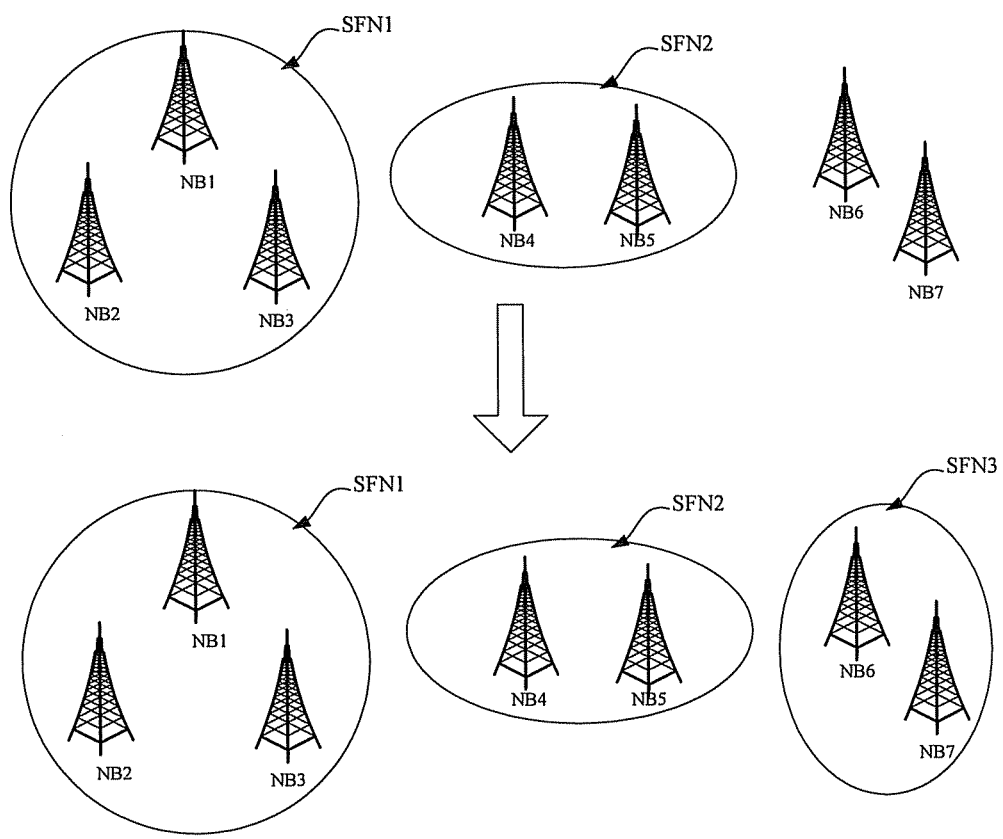
FIG. 2 is a schematic diagram showing the structure of fields contained in signaling according to an embodiment of the present invention.
FIG. 3 shows a first application scenario where a Single Frequency Network is newly added according to an embodiment of the present invention.

For example, signaling is sent to a base station newly added to a certain Single Frequency Network, a base station switching to another Single Frequency Network, and a base station removed from its Single Frequency Network, and the signaling can carry a time stamp, an identifier of a Single Frequency Network controller controlling the Single Frequency Network, an identifier of the base station, an identifier of the Single Frequency Network including the base station, and identifiers of services provided in the Single Frequency Network including the base station. FIG. 2 shows a schematic diagram of the structure of fields contained in the signaling.

Process S106: The current control of the Single Frequency Network is terminated.

The above flow is performed again if the next statistics time point is reached.

Hereinafter, the modes of the control of the Single Frequency Network are described in particular embodiments with reference to the drawings.

A First Embodiment of Adding a Single Frequency Network

Adding of a Single Frequency Network is applicable to the following scenarios.

1). A base station which does not belong to any existing Single Frequency Network (which is referred to as independent base station for the sake of description) is added to a new Single Frequency Network.

Base stations serving User Equipments requesting for one or more types of MBMS services are determined, and if all or part of the determined base stations are independent base stations not belonging to any Single Frequency Network, a new Single Frequency Network is obtained by combining the independent base stations, and one or more of the requested MBMS services are implemented in the new Single Frequency Network.

As shown in FIG. 3; two Single Frequency Networks are present currently, with a Single Frequency Network 1 (Referred to as SFN1 for short) including a first base station (NB1), a second base station (NB2) and a third base station (NB3), and a Single Frequency Network 2 (Referred to as SFN2 for short) including a fourth base station (NB4) and a fifth base station (NB5). The sixth base station (NB6) and the seventh base station (NB7) are independent base stations not belonging to any Single Frequency Network. Based on the statistics and analysis of the service request sent by the User Equipment, the base stations NB6 and NB7 are those serving the User Equipments requesting for a certain MBMS service. In this case, a new Single Frequency Network 3 (SFN4) which includes the base stations NB6 and NB7 and provides at least the MBMS service requested by the User Equipments is added.

After the Single Frequency Network SFN3 is added, mapping relationships between the Single Frequency Network SFN3 and the base stations NB6 and NB7 within the Single Frequency Network SFN3 are necessary to be added to the Single Frequency Network controller. Further, it is necessary to send to the base stations NB6 and NB7 the signaling carrying a time stamp, an identifier of a Single Frequency Network controller controlling the Single Frequency Network, an identifier of the base station (NB6 or NB7), an identifier of the Single Frequency Network (SFN3) including the base station, and identifiers of services provided in the Single Frequency Network SFN3.

2) Base stations are selected to construct a new Single Frequency Network according to the number of User Equipments requesting for a certain or more types of services.

Figure 4:
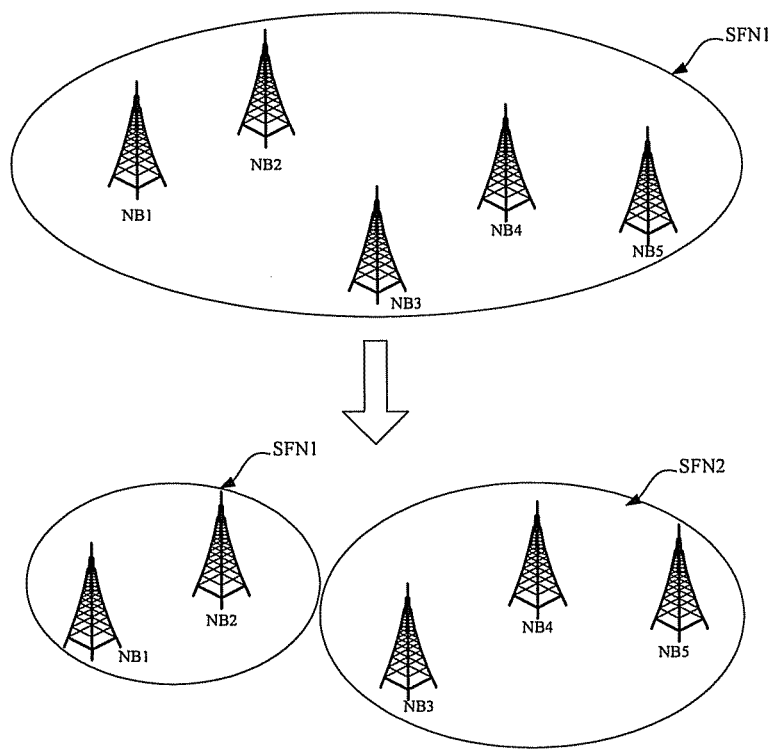
FIG. 4 shows a second application scenario where a Single Frequency Network is newly added according to an embodiment of the present invention.

As shown in FIG. 4, one Single Frequency Network SFN1 including base stations NB1, NB2, NB3, NB4 and NB5 is present currently. After the statistics and analysis of the service request sent by the User Equipments, multiple base stations are found to be involved by User Equipments requesting for a certain MBMS service, the multiple base stations are arranged in sequence according to the numbers of User Equipments requesting for the MBMS service, and the first three base stations NB3, NB4 and NB5 serving the most User Equipments requesting for the MBMS service construct a new Single Frequency Network SFN2 which includes the base stations NB3, NB4 and NB5 and provides at least the MBMS service requested by the User Equipments.

After the Single Frequency Network SFN2 is added, mapping relationships between the Single Frequency Network SFN2 and the base stations NB3, NB4 and NB5 within the Single Frequency Network SFN2 are necessary to be added to the Single Frequency Network controller. Further, it is necessary to send to the base stations NB3, NB4 and NB5 the signaling carrying a time stamp, an identifier of a Single Frequency Network controller controlling the Single Frequency Network, an identifier of the base station (NB3, NB4 or NB5), an identifier of the Single Frequency Network (SFN2) including the base station, and identifiers of services provided in the Single Frequency Network SFN2. As shown in FIG. 4, since the base stations NB3, NB4 and NB5 within the Single Frequency Network SFN2 previously belong to the Single Frequency Network SFN1, they need to be removed from the Single Frequency Network SFN1, as a result, the Single Frequency Network SFN1 includes merely the base stations NB1 and NB2 after the control of the Single Frequency Network.

In the application shown in FIG. 4, all the base stations of the new Single Frequency Network belong previously to another Single Frequency Network. In fact, it is possible that one or more of the base stations serving most of the User Equipments requesting for the MBMS service are independent base stations, that is, a part of the base stations within the new Single Frequency Network belong previously to another Single Frequency Network, a part of the base stations within the new Single Frequency Network are independent base stations.

A Second Embodiment of Removing a Single Frequency Network

1) A certain Single Frequency Network is removed and all the base stations within the removed Single Frequency Network become independent base stations.

If base stations of a Single Frequency Network are found not providing any service requested by User Equipments according to the statistics of the service request sent by the User Equipments, the Single Frequency Network is directly removed. In particularly, the mapping relationships between the Single Frequency Network and the base stations within the Single Frequency Network are removed, and a removing signaling is sent to each of the base stations within the Single Frequency Network to notify the base station that it does not belong to any Single Frequency Network.

Figure 5:
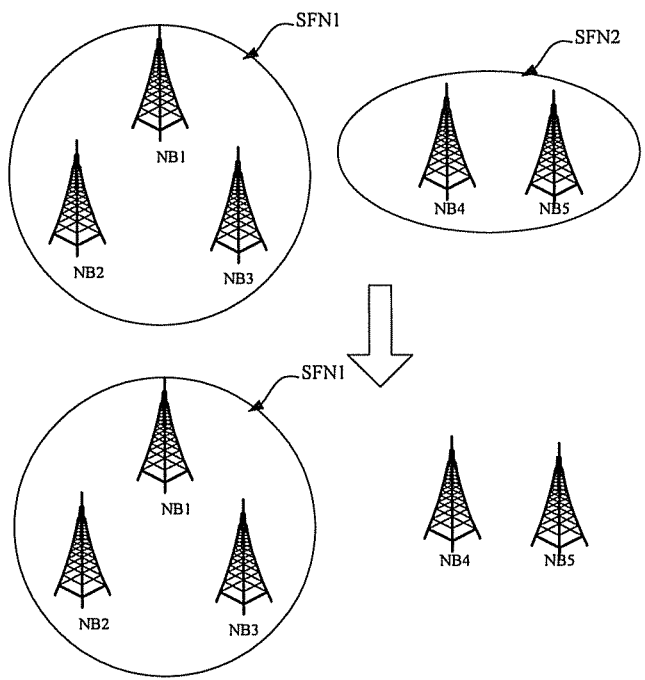
FIG. 5 shows a first application scenario where a Single Frequency Network is removed according to an embodiment of the present invention.

As shown in FIG. 5, two Single Frequency Networks are present currently, with a Single Frequency Network SFN1 including base stations NB1, NB2 and NB3, and a Single Frequency Network SFN2 including base stations NB4 and NB5. In this case, base stations NB4 and NB5 are found not providing any service requested by User Equipments according to the statistics and analysis of the service request sent by the User Equipments, the mapping relationships between the Single Frequency Network SFN2 and the base stations NB4 and NB5 within the Single Frequency Network SFN2, which are stored in the Single Frequency Network controller, are removed directly, and a removing signaling is sent to each of the base stations NB4 and NB5 within the Single Frequency Network to notify the base station NB4 and NB5 that they do not belong to any Single Frequency Network.

2) When a certain Single Frequency Network is removed, all or some of base stations within the Single Frequency Network are moved to another Single Frequency Network.

When the statistics of the service request sent by the User Equipments shows that the services requested by User Equipments served by the base stations in a certain Single Frequency Network have been provided by another Single Frequency Network, depending on the service requested by the User Equipments served by the base stations in the certain Single Frequency Network, all or part of the base stations within the certain Single Frequency Network are added to another Single Frequency Network providing the same service as new base stations, and the certain Single Frequency Network is removed.

Figure 6:
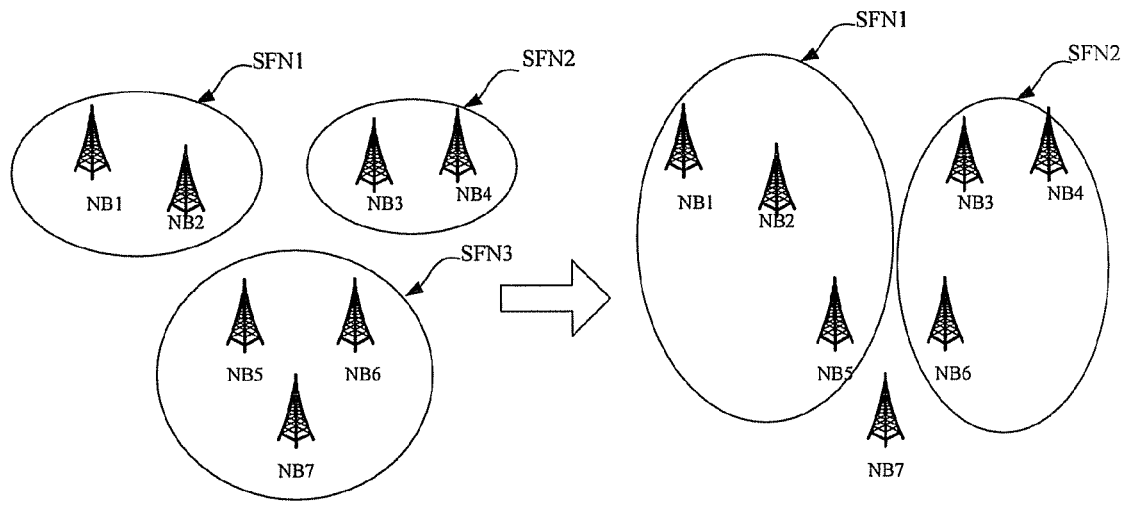
FIG. 6 shows a second application scenario where a Single Frequency Network is removed according to an embodiment of the present invention.

As shown in FIG. 6, three Single Frequency Networks SFN1, SNF2 and SFN3 are present currently. The Single Frequency Network SFN1 includes base stations NB1 and NB2, and is providing services including a first type of service, a second type of service and a third type of service. The Single Frequency Network SFN2 includes base stations NB3 and NB4, and is providing services including the first type of service, the second type of service and a fourth type of service. The Single Frequency Network SFN3 includes base stations NB5, NB6 and NB7, and is providing services including the first type of service and the fourth type of service. Further, the statistics shows that most of User Equipments served by the base station NB5 request for the first type of service, most of User Equipments served by the base station NB6 request for the fourth type of service, and User Equipments served by the base station NB7 do not request for any service. In this case, the Single Frequency Network SFN3 may be removed, and the base station NB5 belonging to the Single Frequency Network SFN3 is moved to the Single Frequency Network SFN1 or SFN2, the base station NB6 belonging to the Single Frequency Network SFN3 is moved to the Single Frequency Network SFN2, and the base station NB 7 is removed and becomes an independent base station. Since the base station NB5 can be moved to either of the Single Frequency Networks SFN1 and SFN2, in practices, the base station NB5 is moved to either of the Single Frequency Networks SFN1 and SFN2, or to the Single Frequency Network (e.g. SFN1) which is closer to the base station NB5 in the geographical position. After such dynamic control, the Single Frequency Network SFN1 includes the base stations NB1, NB2 and NB5, the Single Frequency Network SFN2 includes the base station NB3, NB4 and NB6, and the Single Frequency Network SFN3 is removed.

To implement the above dynamic control, the Single Frequency Network controller needs to perform the following processes including:

removing the locally stored mapping relationships between the Single Frequency Network SFN3 and its included base stations NB5, NB6 and NB7;

establishing a mapping relationship between the base station NB5 and the Single Frequency Network SFN1;

establishing a mapping relationship between the base station NB6 and the Single Frequency Network SFN2;

sending to the base station NB5 the signaling carrying a time stamp, an identifier of the Single Frequency Network controller controlling the Single Frequency Network, an identifier of the base station (NB5), an identifier of the Single Frequency Network (SFN1) including the base station, and identifiers of services provided in the Single Frequency Network SFN1; and sending to the base station NB6 the signaling carrying a time stamp, an identifier of the Single Frequency Network controller controlling the Single Frequency Network, an identifier of the base station (NB6), an identifier of the Single Frequency Network (SFN2) including the base station, and identifiers of services provided in the Single Frequency Network SFN2.

A Third Embodiment of Adding a Base Station to a Single Frequency Network

The base stations serving the respective User Equipments requesting for a certain type of service (which is hereinafter referred to as first service for the sake of description) are determined, and ordered in sequence according to the numbers of their served User Equipments requesting for the first service. Depending on the result of the ordering of the base stations, one or more of the base stations serving most of the User Equipments requesting for the first service are taken as new base stations to be added to a corresponding Single Frequency Network (which is hereinafter referred to as first Single Frequency Network) providing the first service, for example, the determined base stations serving the User Equipments may be arranged in a decreasing order of the numbers of their served User Equipments, and the first one or more base stations in the ordered sequence of base stations are selected to be added to the first Single Frequency Network.

Particularly, if the base station added to the first Single Frequency Network belongs previously to an original Single Frequency Network, the base station needs to be removed from the original Single Frequency Network.

Particularly, if there are multiple Single Frequency Networks providing the first service, the Single Frequency Network adjacent to the base station serving the User Equipment requesting for the first service, the Single Frequency Network having the highest receiving quality, or the Single Frequency Network with the most or least User Equipments receiving the first service may be selected.

Adding the new base station to the first Single Frequency Network providing the first service includes:

establishing and storing a mapping relationship between the new base station and the first Single Frequency Network in the Single Frequency Network controller; and sending to the new base station signaling carrying a time stamp, an identifier of a Single Frequency Network controller controlling the Single Frequency Network, an identifier of the base station, an identifier of the Single Frequency Network including the base station, and identifiers of services provided in the Single Frequency Network including the base station.

A Fourth Embodiment of Removing a Base Station from a Single Frequency Network

If the statistics of the obtained information of services requested by User Equipments indicates that there is one or more base stations to which no service request is initiated by the User Equipment in a certain Single Frequency Network (which is referred to as a second Single Frequency Network for the sake of description), or the number of User Equipments initiating the service requests to the one or more base stations is lower than a preset threshold, or the product of the number of User Equipments initiating the service requests to the one or more base stations and the occupied bandwidth is lower than a preset threshold, then the one or more base stations are removed from the second Single Frequency Network as removing base stations.

Removing one or more base stations from the second Single Frequency Network as removing base stations may include:

removing the stored mapping relationship between the removing base stations and the second Single Frequency Network; and sending a removing signaling to the removing base stations to notify the corresponding base stations that they do not belong to any Single Frequency Network.

The control of the Single Frequency Network has been described in detail through the above four embodiments. It shall be noted that the present invention is aimed to provide a solution of dynamic control of the Single Frequency Network, thus, the particular manner of the dynamic control is not limited to those described in the embodiments. For example, it is also possible to change the types of the services provided by the respective Single Frequency Networks as follows:

The types of services requested by User Equipments served by each of base stations within a Single Frequency Network are determined according to the obtained information of services requested by the User Equipments; and one or more types of services are introduced to the Single Frequency Network if those services are currently not in the list of services provided by the Single Frequency Network. On the contrary, if current one or more types of services in the Single Frequency Network are not requested by the User Equipment, the one or more types of services without being requested by the User Equipment are removed from the Single Frequency Network.

According to the above embodiments, if an independent base station is present between two or more Single Frequency Networks, the independent base station is used to transmit the same service data at the same time and frequency resources as the geographically adjacent Single Frequency Network, to avoid effectively the signal interference between base stations.

Figure 7:
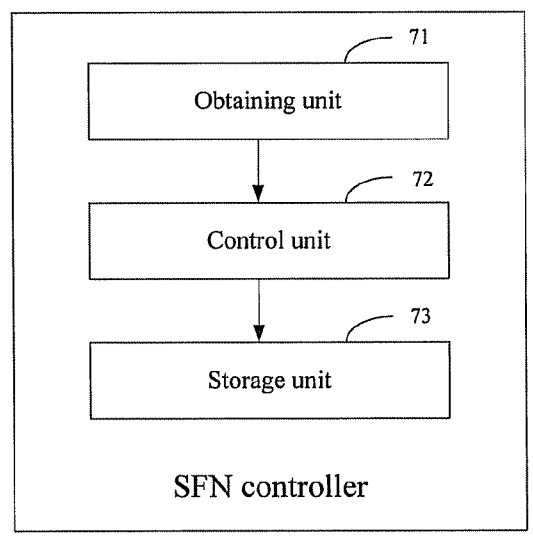
FIG. 7 is a schematic diagram illustrating the structure of a Single Frequency Network controller according to an embodiment of the present invention.

The structure of a Single Frequency Network controller corresponding to the method according to the embodiments above is shown in FIG. 7, and the controller includes:

an obtaining unit 71 configured to obtain a service request sent by a User Equipment; and a control unit 72 configured to change a Single Frequency Network according to the service request.

Preferably, the Single Frequency Network controller may further includes:

a storage unit 73 configured to store a mapping relationship between the Single Frequency Network and each of base stations within the Single Frequency Network.

Figure 8:
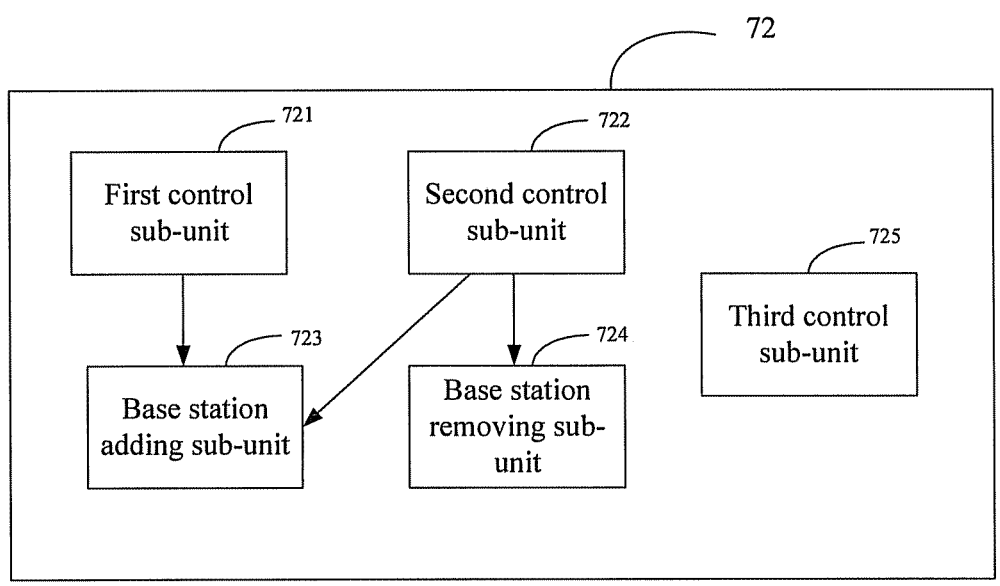
FIG. 8 is a schematic diagram illustrating the structure of a control unit in the Single Frequency Network controller according to an embodiment of the present invention.

The control unit 72 has a structure as shown in FIG. 8 and includes: a first control sub-unit 721, a second control sub-unit 722, a base station adding sub-unit 723 and a base station removing sub-unit 724.

The first control sub-unit 721 is configured to determine base stations to be included in a new Single Frequency Network and a new base station to be added to a Single Frequency Network, and notify the base station adding sub-unit 723 of the determined base station.

The second control sub-unit 722 is configured to determine a base station to be removed from a Single Frequency Network and notify the base station removing sub-unit 724 of the determined base station, and determine any base station within the Single Frequency Network to be removed that needs to be incorporated into some other Single Frequency Network, and notify the base station adding sub-unit 723 of the determined base station.

The base station adding sub-unit 723 is configured to add a base station to a Single Frequency Network to which the base station needs to be added.

The base station removing sub-unit 724 is configured to remove a base station from the Single Frequency Network including the base station.

Preferably, the control unit 72 may further include a third control sub-unit 725 configured to change the type of the service provided by the Single Frequency Network.

As described above, with the Single Frequency Network controlling method and the Single Frequency Network controller according to the embodiments of the present invention, when the service request sent by the User Equipment is received, the statistics and analysis on the service request is performed to implement the dynamic control of the Single Frequency Network, which includes adding of a Single Frequency Network, removing of an existing Single Frequency Network, and adding a base station to or removing a base station from an existing Single Frequency Network (to enable a substitution of a base station within the respective Single Frequency Network), so that the operator can adjust the Single Frequency Network according to the service requirements of users, enable the optimal configuration of wireless network resources, and improve resource utilization. Further, various new services can be deployed through the flexible settings of the Single Frequency Network, the user experience can be further improved, and the network operation value can be increased.

It will be appreciated to those skilled in the art that various modifications and alterations may be made to the present invention without departing from the scope of the invention. Thus, the invention is intended to comprise all these modifications and alterations if they fall into the scope of the invention defined by the appended claims and the equivalents.

The invention claimed is:

1. A method for controlling a Single Frequency Network comprising:
  obtaining a service request sent by a User Equipment; and
  modifying the Single Frequency Network according to the service request,
  wherein modifying the Single Frequency Network according to the service request comprises:
    performing control of the Single Frequency Network; and
    sending signaling to a base station involved in the control of the Single Frequency Network, wherein, before modifying the Single Frequency Network according to the service request,
      performing statistics and analysis on the service request; and
      determining whether to initiate the control of the Single Frequency Network according to a result of the statistics and analysis, wherein performing the control of the Single Frequency Network comprises at least one of:
        adding or removing the Single Frequency Network according to the service request; and
        adding the base station to the Single Frequency Network or removing the base station from the Single Frequency Network, wherein adding the Single Frequency Network according to the service request comprises:
  determining one or more base stations serving User Equipments requesting for one or more types of services; and
  if one or more independent base stations not belonging to the Single Frequency Network are included in the one or more base stations, combining the independent base stations into a new Single Frequency Network, and providing, by the new Single Frequency Network, the one or more types of services;
  or,
  after the determining one or more base stations serving the User Equipments requesting for the one or more types of services, making a sequence of the determined base stations in a decreasing order of the numbers of the User Equipments requesting for the one or more types of services that are served by the base stations, and selecting first one or more base stations in the sequence of the determined base stations as one or more new base stations to be combined into the new Single Frequency Network; and if the new base stations belong to an original Single Frequency Network, removing the new base stations from the original Single Frequency Network; and providing the one or more types of services within the new Single Frequency Network.

2. The method of claim 1, wherein combining the base stations into the new Single Frequency Network comprises:
  establishing a mapping relationship between the new Single Frequency Network and each of the base stations within the Single Frequency Network; and
  sending signaling to each of the base stations within the new Single Frequency Network, with the signaling carrying a time stamp, an identifier of a Single Frequency Network controller controlling the Single Frequency Network, an identifier of the base station, an identifier of the Single Frequency Network including the base station, and identifiers of services provided in the Single Frequency Network including the base station.

3. A method for controlling a Single Frequency Network comprising:
  obtaining a service request sent by a User Equipment and modifying the Single Frequency Network according to the service request,
  wherein modifying the Single Frequency Network according to the service request comprises:
    performing control of the Single Frequency Network; and
    sending signaling to a base station involved in the control of the Single Frequency Network, wherein, before modifying the Single Frequency Network according to the service request,
      performing statistics and analysis on the service request; and
      determining whether to initiate the control of the Single Frequency Network according to a result of the statistics and analysis, wherein performing the control of the Single Frequency Network comprises at least one of:
        adding or removing the Single Frequency Network according to the service request; and
        adding the base station to the Single Frequency Network or removing the base station from the Single Frequency Network, wherein removing the Single Frequency Network according to the service request comprises:
    if all base stations of the Single Frequency Network do not provide any service requested by the User Equipment according to the statistics of the service request sent by the User Equipment, directly removing the Single Frequency Network; or
    when the statistics of the service request sent by the User Equipment shows that each service requested by the User Equipment served by each base station in a first Single Frequency Network has been provided by any other Single Frequency Network, depending on the service requested by the User Equipment served by the base station in the first Single Frequency Network, adding all or part of the base stations within the first Single Frequency Network, as new base stations, to the other Single Frequency Network providing the same service requested by the all or part of the base stations, and removing the first Single Frequency Network.

4. The method of claim 3, wherein directly removing the Single Frequency Network comprises:
  removing a mapping relationship between the Single Frequency Network and the base station within the Single Frequency Network; and
  sending removing signaling to the base station within the Single Frequency Network, to notify the base station that it does not belong to any Single Frequency Network.

5. The method of claim 3, wherein the adding all or part of the base stations within the first Single Frequency Network to the other Single Frequency Network providing the same service as the new base stations and removing the first Single Frequency Network comprises:
  adding the new base stations respectively to the other Single Frequency Network providing the same service, and removing a mapping relationship between the first Single Frequency Network and each of the base stations within the first Single Frequency Network; and
  sending signaling to each of the new base stations, with the signaling carrying a time stamp, an identifier of a Single Frequency Network controller controlling the Single Frequency Network, an identifier of the base station, an identifier of the Single Frequency Network including the base station, and identifiers of services provided in the Single Frequency Network including the base station.

6. The method of claim 3, wherein, in adding the new base stations to the other Single Frequency Network providing the same service, if there are a plurality of Single Frequency Networks providing the same service, the new base stations are added to any one of the Single Frequency Networks providing the same service, or one of the Single Frequency Networks that is geographically adjacent to the new base stations, or one of the Single Frequency Networks that has a highest receiving quality, or one of the Single Frequency Networks that includes a most or least User Equipments requesting for the same service.

7. A method for controlling a Single Frequency Network comprising:
  obtaining a service request sent by a User Equipment and modifying the Single Frequency Network according to the service request,
  wherein modifying the Single Frequency Network according to the service request comprises:
    performing control of the Single Frequency Network; and
    sending signaling to a base station involved in the control of the Single Frequency Network, wherein, before modifying the Single Frequency Network according to the service request,
      performing statistics and analysis on the service request; and
      determining whether to initiate the control of the Single Frequency Network according to a result of the statistics and analysis, wherein performing the control of the Single Frequency Network comprises at least one of:
        adding or removing the Single Frequency Network according to the service request; and
        adding the base station to the Single Frequency Network or removing the base station from the Single Frequency Network, wherein adding the base station to the Single Frequency Network comprises:
  determining one or more base stations serving User Equipments requesting for a first service, making a sequence of the determined base stations in a decreasing order of the numbers of their served User Equipments; and
  selecting and adding first one or more base stations in the sequence of the determined base stations to a first Single Frequency Network providing the first service as new base stations, and removing the new base stations from the Single Frequency Network originally including the new base stations.

8. The method of claim 7, wherein if there are a plurality of Single Frequency Networks providing the first service, the new base stations are added to any one of the Single Frequency Networks providing the first service, or one of the Single Frequency Networks that is geographically adjacent to the new base stations, or one of the Single Frequency Networks that has a highest receiving quality, or one of the Single Frequency Networks that includes a most or least User Equipments requesting for the same service.

9. The method of claim 7, wherein adding the new base stations to the first Single Frequency Network providing the first service comprises:
  establishing a mapping relationship between the new base stations and the first Single Frequency Network; and
  sending signaling to the new base stations, with the signaling carrying a time stamp, an identifier of a Single Frequency Network controller controlling the Single Frequency Network, an identifier of the base station, an identifier of the Single Frequency Network including the base station, and identifiers of services provided in the Single Frequency Network including the base station.

10. A method for controlling a Single Frequency Network comprising:
  obtaining a service request sent by a User Equipment; and
  modifying the Single Frequency Network according to the service request,
  wherein modifying the Single Frequency Network according to the service request comprises:
    performing control of the Single Frequency Network; and
    sending signaling to a base station involved in the control of the Single Frequency Network, wherein, before modifying the Single Frequency Network according to the service request,
      performing statistics and analysis on the service request; and
      determining whether to initiate the control of the Single Frequency Network according to a result of the statistics and analysis, wherein performing the control of the Single Frequency Network comprises at least one of:
        adding or removing the Single Frequency Network according to the service request; and
        adding the base station to the Single Frequency Network or removing the base station from the Single Frequency Network, wherein removing the base station from the Single Frequency Network comprises:
  if the statistics of an obtained information of services requested by User Equipments indicates that there is one or more base stations to which no service request is initiated by the User Equipments in a second Single Frequency Network, or the number of the User Equipments initiating the service requests to the one or more base stations is lower than a preset threshold, or the product of the number of the User Equipments initiating the service requests to the one or more base stations and occupied bandwidth is lower than a preset threshold, then removing the one or more base stations from the second Single Frequency Network as removing base stations.

11. The method of claim 10, wherein removing the one or more base stations from the second Single Frequency Network as the removing base stations comprises:
  Removing a stored mapping relationship between the removing base stations and the second Single Frequency Network; and
  sending removing signaling to the removing base stations to notify the base stations that they do not belong to any Single Frequency Network.

12. A Single Frequency Network controller comprising;
a storage unit configured to store a mapping relationship between a Single Frequency Network and each of base stations within the Single Frequency Network;
an obtaining unit configured to obtain a service request sent by a User Equipment; and
a control unit configured to modify the Single Frequency Network according to the service request,
wherein the control unit further configured to perform control of the Single Frequency Network and send signaling to a base station involved in the control of the Single Frequency Network,
wherein the control unit further configured to perform statistics and analysis on the service request and determine whether to initiate the control of the Single Frequency Network according to a result of the statistics and analysis, before modifying the Single Frequency Network according to the service request,
wherein the control unit comprises a first control sub-unit, a second control sub-unit, a base station adding sub-unit and a base station removing sub-unit,
the first control sub-unit is configured to determine the base station to be included in a new Single Frequency Network and the base station to be added to an existing Single Frequency Network, and notify the base station adding sub-unit of the determined base station;
the second control sub-unit is configured to determine the base station to be removed from the Single Frequency Network and notify the base station removing sub-unit of the determined base station, and determine any base station within the Single Frequency Network to be removed that needs to be incorporated into any other Single Frequency Network, and notify the base station adding sub-unit of the determined base station;
the base station adding sub-unit is configured to add a base station to the Single Frequency Network to which the base station needs to be added; and
the base station removing sub-unit is configured to remove the base station from the Single Frequency Network including the base station.

13. The Single Frequency Network controller of claim 12, wherein the control unit further comprises a third control sub-unit configured to change the type of the service provided by the Single Frequency Network.

* * * * *